March 11, 1952 — G. F. RICHARDS — 2,588,880
DOOR DRIVE SYSTEM
Filed March 2, 1949
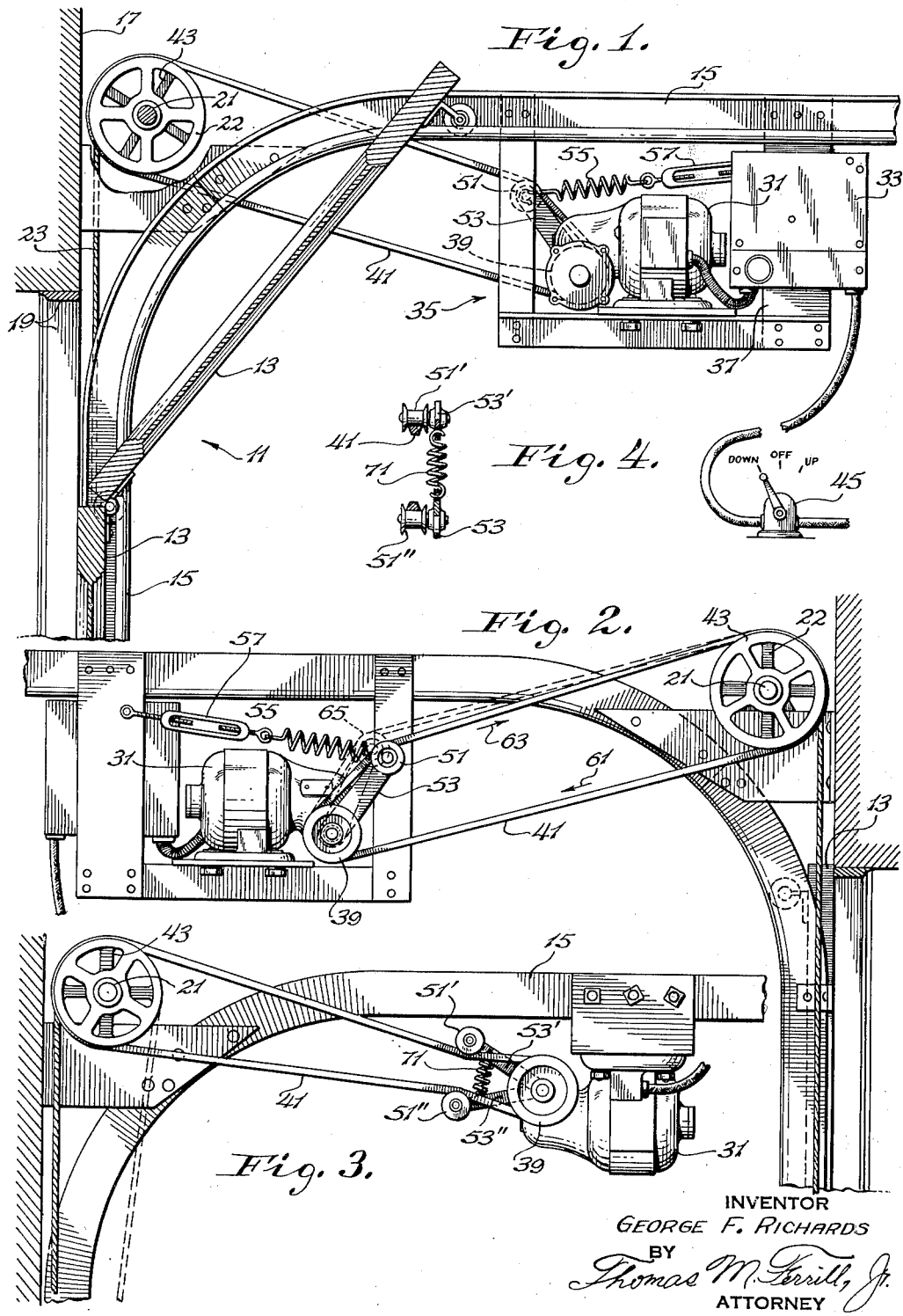
INVENTOR
GEORGE F. RICHARDS
BY Thomas M. Terrill, Jr.
ATTORNEY Patented Mar. 11, 1952

2,588,880

UNITED STATES PATENT OFFICE 2,588,880

DOOR DRIVE SYSTEM

George F. Richards, Garden City, N. Y., assignor to Teletronics Laboratory, Inc., Westbury, N. Y., a corporation of New York Application March 2, 1949, Serial No. 79,215

3 Claims. (Cl. 268—59)

The present invention is in the field of control equipment for movable objects, and deals with the provision of an arrangement particularly suited for raising and lowering movable doors such as sectional overhead garage doors.

This invention contemplates an arrangement for serving the dual purposes of maintaining a desired normal tension in a drive belt coupling a motor drive pulley to a pulley arranged on the door suspension system, and for automatically tightening the drive belt upon bringing the door to the limit of its zone of movement, in such a way as to prevent any bounce or backlash of the door and to hold it locked firmly in its limit position.

An object of this invention is to provide a mechanical system of maximum simplicity for accomplishing the above-mentioned dual purposes of normal belt tensioning and of substantially tightening and locking the belt upon the arrival of the door or other movable object at a desired extreme of its travel, e. g., at one or both of the limit positions of the sectional overhead garage door.

This is accomplished by arranging a belt drive system extending between a motor drive pulley and a driven pulley coupled to the movable object such as the garage door, with one or more pivotally suspended idler pulleys urged by a spring into positions in contact with the drive belt.

Preferably, the pivotal axis for the idler pulley suspension arms is aligned substantially with the motor drive pulley axis. The spring tension is so arranged as to cause appreciable deflection of the aforementioned leg of the belt, e. g., to form an angle of the order of 150° to 130° between the portion of the belt extending from the idler to the motor pulley and the portion extending to the driven pulley. This normally keeps the belt under the desired tension during upward or downward drive of the door.

Upon driving the door or other movable object to the predetermined limit, e. g., the lowermost limit position of the garage door, the torsional reaction in the driven pulley greatly increases, so that the leg of the belt which has been moving toward the motor pulley is greatly tightened, and is stretched to an abnormal length. Accordingly, the opposite leg of the belt, that leg characterized by movement from the motor pulley toward the driven pulley during descent of the door, is caused to have somewhat increased length so that the spring acting on the idler pulley and idler pulley arm materially increases the deflection of this leg of the belt, tending to increase the resistance to further movement of the belt. Generally speaking there is a slight tendency of the door to rebound upon reaching its limit of downward movement, but such rebounding then tends to cause the belt movement direction to reverse, and with the considerably sharpened angle of deflection of the leg against which the idler pulley acts and the consequent binding of the belt on this pulley, this brief belt reversal tends to move the idler pulley to a still further extent and further increase the belt deflection. As a consequence, the belt is so greatly tightened along with the increased deflection of the idler pulley as substantially to lock the belt against appreciable slip and to resist staunchly such rotation of the driven pulley as normally must accompany rebound of the door.

These features are illustrated and clarified by reference to the accompanying drawings wherein;

Fig. 1 shows mainly in side elevation, an arrangement of a garage door drive system embodying the lock-down feature of the present invention;

Fig. 2 shows a further side elevation taken from the opposite direction, the view in Fig. 2 representing the successive positions of the idler system just as the door reaches its lowermost position;

Fig. 3 illustrates a preferred embodiment of the present invention, employing two idler pulleys, one acting on each belt leg; and Fig. 4 illustrates the manner in which the idler pulleys operate in contact with the broad flat back of the V-belt.

Referring now to Figs. 1 and 2, a sectional garage door system 11 is illustrated as including a plurality of hingedly connected door sections 13 having their hinge pivot axes guided in a pair of parallel guide tracks, one of the tracks 15 being visible in the view of Fig. 1. The track 15 and the similar track which is not visible in this figure include parallel vertical portions and parallel substantially horizontal or very slightly inclined portions, with a curve of appreciabe radius being formed therebetween. The door sections 13 are illustrated in cross section, four or more such sections usually being provided in a door unit.

The upper portion of the front wall of the building in which the door system is installed is illustrated at 17, the door frame being shown at 19.

As the total weight of the movable sections of overhead door systems of this type usually is a few hundred pounds, it has been the custom to provide a large counterspring system acting in the direction in opposition to gravity, i. e. to tend to lift the door, to provide for substantially balanced action of the movable door system. A desirable and popular type of counterspring system for this purpose comprises a counterspring shaft 21 extending substantially horizontally and substantially parallel to the wall 17, over a span somewhat exceeding the span between the guide tracks. A winch-type pulley 22 is fixed to this shaft near each end thereof, and is provided with a suspension cable 23 extending down to a point at which it is tied to the lowermost door section. The counterspring (not shown) is fitted over the counterspring shaft 21 and attached thereto at one end, and anchored at its opposite end. This counterspring is arranged to be deflected only slightly from its non-stressed condition when the door is fully raised, and to be increasingly deflected and stressed as the door moves downward, until at the lowermost position of the door, it exerts a force through the suspension cable 23 and the similar suspension cable at the opposite end of the counterspring shaft, this force substantially equalling or slightly exceeding the total weight of the door sections.

The parts of the sectional door and guide and counterspring system thus far described constitute well known and generally used overhead door systems, and in the past, have usually been provided with handles and key-operated locks for full manual raising and lowering of the overhead door.

In the present arrangement, a motor drive system including a motor 31 and control circuits accessory thereto in a box 33 are suspended by a substantially rectangular frame 35 from track 15. One vertical member 37 of this suspension system preferably is made with great breadth for enhanced rigidity of the suspension frame 35.

The motor 31 is provided with a V-belt drive pulley 39 internally geared to the high speed rotor for reduced pulley drive speed. This pulley 39 is coupled by a V-belt 41 to a V-belt pulley 43 firmly attached to the counterspring shaft 21.

A switch 45 is provided for selectively turning off the motor 31, or operating it in one direction to drive the door sections 13 upward or in the opposite direction to drive them downward to close the door.

With the suspension cables such as cable 23 passing over the winch pulleys and downward in the counterclockwise direction as viewed in Fig. 1 and the clockwise direction as viewed in Fig. 2, the upper leg of the belt is made to travel from the motor pulley 39 toward the driven pulley 43 for driving the door downward, and pulled in the opposite direction by motor pulley 39 for driving it upward; and conversely, the lower leg of the belt is pulled from the driven pulley 43 when the door is lowered and is made to move toward pulley 43 when the door is raised.

In accordance with the principles of the present invention, an idler pulley arrangement including a pulley 51 and a movable idler support arm 53 is arranged with a spring 55 for appreciably deflecting that leg of the drive belt 41 which moves toward the driven pulley 43 during the descent of the door. In this case, the cable 23 being passed counterclockwise over the winch-type pulley 22 and downward as seen in Fig. 1, this idler system 51, 53, 55 is made to act against the upper leg of the belt 41.

The spring 55 is adjusted through the use of turnbuckle 57 to such tension as normally to produce an angle of the order of 140° to 160° between the right-hand and left-hand parts of the upper leg of the belt 41.

Preferably, though not necessarily, the pivotal axis of the idler pulley arm may be made coincident with the axis of the motor drive pulley 39; or if not coincident with the motor drive pulley axis, the pivotal axis of this arm should be nearer to the axis of the motor drive pulley than the region at which the idler pulley acts against the belt 41.

As viewed in Fig. 1, the switch 45 is shown with its control arm set for downward drive of the door and the door sections are illustrated as having descended through the greater part of the distance toward the closed door position.

Fig. 2 shows the system with the door fully lowered, the uppermost of the sections 13 being in contact at its upper front edge with the doorfacing members of the frame 19. The idler pulley arm 53 and pulley 51 are shown in full lines as deflected to the normal extent prevailing during movement of the door and thus, at the position prevailing until the door jams shut. Upon the full closure of the door, the continued torque exerted by the motor 31 in the direction indicated by arrows 61 and 63 produces appreciable tension in the lower leg of the belt 41, because the motor now acts against the very great torque of the fully wound counterspring unaided by the weight of the door 13. The motor, being of proper capacity for driving the counterbalanced door, is quite unable to cause further revolution of the pulley 43 and the counterspring shaft 21 against this excessive load but the lower leg of the belt 41 being now accordingly very tightly stretched, the upper leg of the belt is appreciably slackened so that pulley 51 is pulled sharply upward and to the left as seen in Fig. 2 to the dotted line position shown at 65, or to an ever greater extent, depending upon the length and the elasticity of the belt 41. In this action, the belt 41 is caused to be much more tightly seated in the drive pulley 39 and driven pulley 43, and moreover, the angle produced between the right and left portions of the upper leg of the belt is appreciably sharpened, so that any reverse rotation of belt 43 such as that occasioned by upward bounce of the door sections is very strongly resisted. Moreover, if the door sections do rise even to the slightest extent, permitting pulley 43 to react in the counterclockwise direction (Fig. 2) under the force of the countershaft spring, the upper leg of the belt is caused to move to the left as seen in Fig. 2, and it carries the idler pulley to a position of still further leftward deflection than that indicated at 65. Thus, the belt is very greatly tightened, and in view of the high ratio speed step-down gearing between the motor rotor proper and the motor drive pulley 39, the motor system and idler pulley arrangement as thus organized is fully effective to guard against counterclockwise rotation of the counterspring shaft. With this shaft fully blocked as in the above-described condition, the door 13 is not positively locked downward by direct rigid connection of the pulley 43 or counterspring shaft, but being suspended by flexible cables, is now simply prevented from being counterbalanced to any extent by the counterspring system. Hence, anyone attempting to open the garage door and enter therethrough would be compelled to lift the entire weight of the garage door, a weight which generally is in excess of 200 pounds, and in the event of large door units, may exceed 400 pounds. Thus, the idler system as arranged in conjunction with the above-described leg of the belt serves a purpose in strongly resisting intrusion as well as in suppressing rebound of the door and holding it closed upon arrival of the door at its lowermost position.

Upon driving the door to its lowermost position, the motor becomes stalled, and the motor circuit may be opened by a thermal cut-off arrangement temporarily, or the alertness of the operator may be relied upon for throwing the arm of switch 45 to the off position immediately after the door has been fully closed. Automatic door control apparatus for remote control from an automobile, as through a magnetic pulse transmitter system, may be provided in place of the direct manual control switch 45 as illustrated in my copending application Serial No. 45,759, filed August 23, 1948.

In Fig. 3 there is illustrated a preferred embodiment of the present invention wherein bilateral locking and belt tightening action is provided by two elastically urged idler units—one working on each leg of the belt between the motor drive pulley 39 and the driven pulley 43 on the counterspring shaft 21.

The upper pulley 51' is journalled on the end of one arm 53', and the lower pulley 51'' is similarly journalled on the end of the other arm 53''. These arms 53' and 53'' are pivoted about the motor drive pulley axis, and are urged toward each other by a tension spring 71 acting between them.

In this version of the invention, the pulleys 51' and 51'' act on the broad flat outer surface of the V-belt, as illustrated in the detail cross-sectional view of Fig. 4, and accordingly these pulleys preferably are spool-like, with relatively long cylindrical sections flanged at the ends. They are accordingly made quite tolerant of the lateral position of the belt. Acting on the back of the belt, they increase the wrap-around on the pulleys. As these idler pulleys act at radius arms from the motor drive pulley 39 appreciably smaller than half the distance to the driven pulley 43 on the door counterspring shaft, they are able to increase the wrap-around on the motor drive pulley to well above 180°, even if the diameter of this pulley is somewhat less than the diameter of the driven pulley.

Since this version of the invention is duo-lateral in its action, it is equally well suited for those installations where the door suspension cable 23 passes counterclockwise over the broad-rim pulley or sheave 22, downward to the door as viewed in Fig. 1, and for those installations where it takes the opposite (clockwise) direction.

Furthermore, the arrangement of Fig. 3 not only provides locking action to suppress backlash or bounce of the door at the end of its descent and to resist uninvited entry via the garage door, but moreover, it acts similarly to hold the door firm upon its arrival at the opposite extreme of its travel.

With the door suspension cable 23 passing counterclockwise downward in Fig. 3 just as in Fig. 1, the motor drive pulley 39 pulls the lower leg of the belt 41 to provide descent of the door. When the door reaches the lower limit of its travel, this leg of the belt is appreciably tightened, stretching it somewhat, and providing elongation of the upper leg of the belt, so that the upper pulley 51' is pulled sharply downward. The idler pulleys 51' and 51'' then appear deflected downward from their running positions shown in Fig. 3. Any tendency of the door to rebound upward acts to stretch the lower leg of the belt yet further, so that the upper idler 51' is made to deflect the upper leg of the belt even more. Under these conditions, the V-belt is quite tightly wedged in the motor drive pulley and in the driven pulley, insuring against any opening of the door against the internal non-reversible-action gearing in the speed reduction system of the drive motor.

Upon driving the door to the fully raised position, where it is blocked by the upper limit stop affixed to the rails, the upper belt is tightened and the lower belt leg is slackened, so that the lower idler pulley 51'' is drawn sharply upward, again insuring against backlash in the system.

A feature of this embodiment of the invention is its adaptability to door systems with the suspension cable extending downward from the door side of the counterspring shaft sheave or with the suspension cable extending downward from the opposite side of the counterspring shaft sheave. As is immediately apparent, the symmetry of the arrangement of Fig. 3 makes it independent of the door drive direction, i. e., it operates equally well whether the motor pulley operates clockwise to raise the door as shown, or in the opposite direction.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a sectional garage door system including a pair of tracks extending upwardly and rearwardly, a door guided therein and including multiple hinge-connected sections, and a cross-shaft between said tracks and coupled to said door, said cross-shaft having a V-pulley thereon; a motive unit for said door system including an electric motor having speed reduction gears and a low-speed output V-pulley aligned coplanarly with said cross-shaft V-pulley; an endless V-belt extending over said motor output V-pulley and said cross-shaft V-pulley and having appreciable slack therein; at least one idler pulley arm and one idler pulley thereon bearing against the leg of said belt wherein tension is exerted to raise said door, said idler pulley arm being pivotally mounted to enable said idler pulley to contact said leg of said belt; means including said motive means for driving said door downward to the lower limit of its travel and stalling said motor, thereby increasing the length of the belt in said leg between said V-pulleys by virtue of the increased tension in the opposite leg of the V-belt; and means including said idler pulley arm and said idler pulley and elastic means coupled to said idler pulley arm for normally providing appreciable deflection in said contacted belt leg during movement of said door and for materially increasing the deflection of said contacted leg of said belt and retaining it in the position of increased deflection when said door is forced to its closed position, thereby retaining the door closed with appreciable downward force exerted thereon after said motive means is de-energized.

2. In combination, an object movable in guide means between first and second opposite fixed limits of travel, a first V-pulley coupled to said object, a reversible motive unit for said object including an electric motor having speed reduction gears and a low-speed output V-pulley aligned with said first V-pulley, an endless V-belt extending over said first V-pulley and said motor output V-pulley and having appreciable slack therein for the circuit over said V-pulleys, said reversible motive unit and said V-belt comprising means for driving said object at low speed between said first and second fixed limits of its travel, first and second idler pulley arms pivoted about the axis of said motor output V-pulley, said first arm having a first idler pulley in contact with the outer surface of the leg of said V-belt wherein tension is exerted to drive said object toward said first fixed limit and said second arm having a second idler pulley in contact with the outer surface of the leg of said V-belt wherein tension is exerted to drive said object toward said second fixed limit of its travel, a tension coupling between said first and second arms tending to pull each of said idler pulleys toward the other and to provide deflections of the respective legs of the belt, means including said reversible motive means for driving said object forcibly against said first limit of its travel and stalling said motor by the increased torque load thereon whereby said first idler pulley is forced outward by the increased tension in the belt leg in contact therewith, the second idler pulley and second arm being moved to a position of increased deflection by the increased slack in the leg of the belt in contact therewith and by the pull thereon communicated by said tension coupling as said first pulley is forced outward, thereby retaining the movable object forced against said first fixed limit by the tension in said belt leg contacted by said first idler pulley after deenergization of said motor.

3. The combination defined in claim 2, wherein said object comprises a sectional garage door guided in side rails having vertical sections and slightly inclined sections, and said first pulley comprising a cross-shaft pulley on a shaft coupled to both sides of said door by drum-wound suspension cables.

GEORGE F. RICHARDS.

REFERENCES CITED

The following references are of record in the file of this patent:

UNITED STATES PATENTS

| Number | Name | Date |
| --- | --- | --- |
| 439,790 | Pollock | Nov. 4, 1890 |
| 864,846 | Jenney | Sept. 3, 1907 |
| 976,115 | Bard | Nov. 15, 1910 |
| 1,222,090 | Findley | Apr. 10, 1917 |
| 1,897,391 | Kelley | Feb. 14, 1933 |
| 2,099,191 | Blodgett | Nov. 16, 1937 |
| 2,378,262 | Vallen | June 12, 1945 |